(12) United States Patent
Horton et al.

(10) Patent No.: US 6,757,357 B1
(45) Date of Patent: Jun. 29, 2004

(54) FAILURE RESPONSE PROCEDURE AND SYSTEM

(75) Inventors: Ronald L. Horton, Charlotte, NC (US); Arthur E. Finch, Franklin, TN (US); Donald L. Pickens, Atlanta, GA (US); Michael D. Gaines, Alpharetta, GA (US); Lawrence T. Keaton, Marietta, GA (US); James Michael Hargrove, Dunwoody, GA (US); Everett Glen Shull, Duluth, GA (US); Carl E. Moering, Atlanta, GA (US); William Stogner, Charlotte, NC (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/515,816

(22) Filed: Feb. 29, 2000

(51) Int. Cl.[7] .............................. H04M 1/24; H04M 3/08
(52) U.S. Cl. .................... 379/9.03; 379/9.04; 379/9.02; 379/1.01; 379/32.01; 379/29.09; 379/29.1
(58) Field of Search ............................... 379/1.01, 1.03, 379/9, 9.01, 9.02, 9.03, 9.04, 14.01, 10.01, 15.02, 15.03, 15.05, 29.01, 29.02, 29.08, 29.09, 29.1, 32.01, 26.01, 27.04, 202.01; 455/423

(56) References Cited

U.S. PATENT DOCUMENTS 5,946,372 A * 8/1999 Jones et al. ..................... 379/1
6,301,336 B1 * 10/2001 Branton, Jr. et al. ..... 379/29.01
6,389,112 B1 * 5/2002 Stewart et al. ........... 379/29.09
6,411,678 B1 * 6/2002 Tomlinson, Jr. et al. ... 379/1.01
6,449,365 B1 * 9/2002 Hodges et al. ............. 379/9.03
6,480,469 B1 * 11/2002 Moore et al. ............ 379/29.01

* cited by examiner

Primary Examiner—Rexford Barnie
(74) Attorney, Agent, or Firm—Kirkpatrick & Lockhart LLP

(57) ABSTRACT

A failure response method is provided. The method includes preparing a bridge having an address of a telecommunication system for common access by a predetermined group of resources, sending an alpha communication communicating the telecommunication system address to the predetermined group of resources, coordinating the resources through the bridge to correct the failure, and sending a final message to the predetermined group of resources by the telecommunication system when the failure has been corrected. A failure response system is also provided. The failure response system includes a storage device containing contact data for a predetermined group of resources to be utilized when responding to a failure and an address of a telecommunication system for common access by the predetermined group of resources. The system also includes a processor containing instructions which, when executed by the processor, cause the processor to retrieve the contact data for the predetermined group of resources from the storage device, retrieve the address of the telecommunication system from the storage device and send an alpha communication communicating the telecommunication system address to the predetermined group of resources. A computer readable medium is also disclosed.

20 Claims, 12 Drawing Sheets

*Login Page*

Enter Login:    Enter Password:

Select a Function: | Send a Page ▼ |

| Login | | Reset |

View Paging Logs

FIGURE 4

*Edit Pagers*

Editing Pager Information for [USER'S NAME]

Paging Lists Section:

User's paging lists are displayed in the Selection Box on the left. All available lists are shown on the right. Select the list from which you want to be removed on the left, and select the lists to which you want to be added on the right. Click the "Remove / Add" button beneath to refresh the page and see your changes.

Your Paging Lists:　　　　Available Lists:

| Bridge Manager - Facility  | Pager Group 1 |
| NRC Paging List | Pager Group 2 |
| | Pager Group 3 |
| | Pager Group 4 |
| | Pager Group 5 |
| | Pager Group 6 |
| | Pager Group 7 |
| | Pager Group 8 |
| | Pager Group 9 |

Status: unchanged

[ Remove / Add ]　　[ Reset ]

John Doe
Jane Doe

Group: NRC

To edit lists for another user in your group, Select the user on the left and click here:

[ Get Lists ]

FIGURE 5

Subscriber Info Section:

Click on the "Change" button below to record changes made here to your subscriber information.

| Name: | Title: |
|---|---|
| User's Name | NRC Staff Specialist |

| Service: | PIN: |
|---|---|
| MobileComm NW ▼ | 2222 |

Status: unchanged

[ Change ] [ Reset ]

---

Change Password Section:

Enter old password:

[          ]

Enter new password in BOTH boxes below:

[          ]   [          ]

Password Status: unchanged

[ Change ] [ Reset ]

---

Select a Function:  [ Send a Page ▼ ]

[ GO ]

---

NRC Online | ROC Homepage | Divisions | Links | Tools | Mailbox | HELP

FIGURE 6

*Send a Page*

Select Paging Group(s):     Select Individual(s):

| Paging Group 1 | John Doe |
| Paging Group 2 | Jane Doe |
| Paging Group 3 | |
| Paging Group 4 | |
| Paging Group 5 | |
| Paging Group 6 | |
| Paging Group 7 | |
| Paging Group 8 | |

To send a message to a pager not listed:

Enter Access:   Enter PIN:

Message text (limit 480 characters):

Character Count [ 0 ]

Note: messages over 240 characters will be sent as 2 pages.
The maximum length is 480 characters.

[ SEND ]   [ CLEAR ]

Select a Function: [ Send a Page ▽ ]

Facility Event Management

Regional Operation Center Process Checklist

Purpose: When a network outage occurs, it is necessary to activate various Regional Operational Center agencies with one focused purpose. The Network Reliability Center, both Surveillance and Analysis, the Network Management Center, and the Regional Technical Support Center, will come together, with urgency, to form a team to resolve the network outage as quickly as possible. The team will provide Leadership, Technical Support, and outage bridge Administration. The team may invoke any other agency outside the ROC to resolve the outage.

1. Trouble is identified by the NRC NMA/Tim or by the NMC TIM/NTM.
   A. Check facility log for local field activity.
   B. Notify NRC floor supervisor to verify alarm meets abnormal condition.
   C. Advise NRC floor supervisor of location of the trouble.
   D. Advise NRC floor supervisor of the seriousness of the situation.
   E. Create WFA ticket and hand-off to the WMC/CCG and the trouble location.
   F. Attempt contact with the field technician at trouble location and document in WFA.
   G. Notify Analysis of abnormal network outage.
   H. Advise NRC floor supervisor of the rate of Blocked Calls and the total of blocked calls.
2. Send Alpha page to ROC.
3. If 911 involvement is suspected, advise 911 Center.
4. If SS7 involvement is suspected, send a person to INSAC Node group to make personal notification.
5. Check for capacity and implement reroutes if possible.
6. Follow up with WMC/CCG.
   A. Verify ticket is loaded to technician and get the estimated time of arrival.
   B. Verify Central Office FWG and/or Construction has located or is in the process of locating the failure.
   C. Give dispatch status and updates to the bridge.
   D. Request the names and contact numbers of the supervisors and area managers for inside and outside FWG.
   E. Request first level notification immediately and advise we are blocking calls.
7. Contact all FWG area managers involved with network failure by urgent voice mail.
8. Initiate Abnormal Service Condition Report per BSP 010-400-001BT.

| | NRC Surv. | NRC Anal. | Bridge MGR. | NMC | RTSG Trans. | RTSG Power |
|---|---|---|---|---|---|---|
| 1. | X | | | | | |
| A. | X | | | X | | |
| B. | X | | | X | | |
| C. | X | | | X | | |
| D. | | | | | | |
| E. | X | | | | | |
| F. | X | | | | | |
| G. | X | | | X | | |
| H. | X | | | | | |
| 2. | | | | | | |
| 3. | | | | X | | |
| 4. | | | | X | | |
| 5. | | | | X | | |
| 6. | | | | | | |
| A. | X | | | | | |
| B. | X | | | | | |
| C. | X | | | | | |
| D. | X | | | | | |
| E. | X | | | | | |
| 7. | X | | | | | |
| 8. | X | | | | | |

FIGURE 8

| | NRC Surv. | NRC Anal. | Bridge MGR. | NMC | RTSG Trans. | RTSG Power |
|---|---|---|---|---|---|---|

The following is to be performed upon receipt of a phone call from NRC facility surveillance and simultaneously with other start up activities being performed by other ROC agencies.

9. Determine what has failed (system ID's, relay rack locations, TID's, SCID's) and what network element is reporting alarm, if equipment failure, determine what type of equipment and vender.
  A. Perform alarm scan.
  B. Browse network element if applicable for alarm status and conditions.
  C. Determine if it appears to be equipment failure or a cut.
  D. Determine if an isolation has occurred, obtain 2/6 codes for SS7 links, E911 links, or message trunks and use the code to populate the FEHR screen in tirks to determine any common facility.
  E. Determine between which offices the failure has occurred.
  F. Determine cable Designation.
  G. Pull DRS/TIRKS for fiber splicing order by priority if cut fiber cable.
  H. Check DRS for patching options.
  I. Pull DRS for carrier totals.

Scope and impact of the outage

10. Does the NMC see Emergency Services (ES) trunk groups affected?
11. Has the NRC checked for alarms in PSAP groups and verified these alarms in the switch?
12. Which trunk groups are affected?
13. Are trunk groups associated with other switches affected?
14. Are the CCS7 single link failures associated with the outage?
  A. Use both STM and TIM 8 to ensure that impacted CCS7 is not missed due to operations system problems.
  B. Use STM to view alerts generated for a specific interexchange Carrier.
    1. The A office, Z office, and 2/6 codes for link alerts are available in STM.

FIGURE 9

Generally speaking, at this point in time, most participants have joined the bridge. The Bridge Manager, with urgency and professionalism, will ask the following questions and perform the following tasks.

15. Has the WMC joined the bridge?
16. Are double dispatches needed to different offices?
17. A time line will be started and a list of names on the bridge will be taken.
18. The bridge manager will ask the following questions:
    A. Is FAA and or 911 involved in the failure?
    B. Is the outage FCC reportable? (IF so VMS should include Elton King)
    C. Will the failure have major media or major customer impact?
19. The bridge manager will maintain control of the bridge.
20. The RTSG specialist will control and lead the restoration efforts.
21. The bridge manager will get the necessary people involved.
22. The Bridge manager will notify the Officers of the company (per Section 4.0) as the event reaches 30,000 BellSouth blocked calls or 40,000 AT&T blocked calls.
    A. The Bridge manager will notify the Officers of the company (per Section 4.0) as the event reaches 30,000 BellSouth blocked calls or 40,000 AT&T blocked calls.
23. The bridge manager should remind the NRC technician to maintain notes in WFA.
24. Identify to the restoration team on the call, what alarm or alarms triggered the call and which Central office has been named as the central focus.
25. Has the Alarm Reference Guide (ARG) been utilized to help isolate the trouble?
26. Is this an out of service condition?
27. How many systems have failed? (Use DRS to determine).
28. Is this a facility or equipment failure?
29. If no NMA alarms exist, have switch analysis look at trunk alarms.
30. What has failed? (DS3, Optical, Media, etc.).
31. Has dispatch been made and to where?
32. Do we have any customer reports?
33. Is E911 or internal customers affected and to what extent? (BSCN, Operator Services, RRC, BRC, ACAC, etc.)
34. Do we have a technician in the office to work on the trouble? If necessary escalate to the WMC for immediate dispatch and notify the bridge.
35. Has the type of equipment (mux, dcs, optical system) been identified?
36. Has target ID, relay rack, office cilli, and SCID numbers been identified?
37. Do we know when the outage begin?
38. Check the ticket history.
39. Are there maintenance spares and or software for backups in the office?
40. Has there been any provisioning or maintenance activity that may be contributing to the failure?
41. If a network element, can NMA and the co technician communicate with the network element in question?

FIGURE 10

| NRC Surv. | NRC Anal. | Bridge MGR. | NMC | RTSG Trans. | RTSG Power | |
|---|---|---|---|---|---|---|
| | | | | | | 42. If a facility problem is suspected: |
| | | X | | X | | A. Has it been tested with a test set from the DSX1 and or the DSX 3 bay before and after the DCS frame? |
| | | X | | X | | B. Will a loop at the DSX clear the DCS for that particular facility? |
| | | X | | X | | 43. If an equipment trouble is noted, has any cards been exchanged to clear this type of trouble? |
| | X | | | X | | 44. Verify that RTSG is on the bridge and someone is in the office, if alarms are not present, describe what is out and how the service is configured (Ring map type information). |
| | X | X | | | | 45. Infrastructure Planning maps are available in order to understand the nature of the facility failure. |
| | X | X | | | | A. These maps include DCS hubbing, Sonet rings, and Interoffice facilities. |
| | | X | | | | 46. If a cut fiber facility has been isolated between two offices, check to see if an OTDR is available, to be used to determine exact location of the cut fiber cable. |
| | | | | | | 47. Analysis will have splicing sequences available. |
| | | X | | | | 48. Has there been any recent fiber damage or rearrangement that resulted in new splices that now may be making the signal HOT? |
| | | X | | | | 49. Obtain the number of: ET's, Backhoes, and splicing trailers dispatched. |
| | | X | | | | 50. If DRS reveals patching opportunities, request CO FWG patch carriers. |
| | | X | | | | 51. Ask NMC if traffic can be rerouted during major outrage events. |
| X | | | | | | 52. If this is a pattern alarm, where are all the components coming from? |
| | | X | | | X | 53. Are CO power alarms being reported via NMA? If so, record alarms and time received in the NRC. |
| | | X | | | X | 54. Are CO power alarms being reported via switch surveillance? If so, record these alarms and the time received, Check for BDFB, ring and tone, battery, or converter plant alarms. |
| | | | | | X | 55. If there is no power alarms in the NMA/facility or switch surveillance systems, has appropriate power been reported present at the power distribution bay that feeds the failed facility equipment? If yes, this is a facility problem, not power. |
| | | X | | | X | 56. Record which power FWG technician was notified and at what time. |
| | | X | | | X | 57. Track the status of the technician (on the way to the office or at the office) and record the time of arrival. |
| | | X | | | X | 58. Record the technician phone contact information (pager, cell phone, and central office phone number). |
| | | X | | | X | 59. Record which RTSG Power specialist is on the bridge, their phone number, pager number, and the time they joined the bridge. |
| | | | | | X | 60. When the power technician arrives at the CO, verify that the power equipment in alarm has actually failed. |
| | | | | | X | 61. If the power alarm is legitimate, the power technician and the RTSG power specialist will troubleshoot to determine the best method for correction, either repair or replacement. |
| | | X | | | X | 62. Ask the power technician or power specialist what is being done and the estimated time of restoration. |
| X | | | | | X | 63. When the correction is complete, verify the power alarm has cleared locally and at the NRC. |
| | | | | | X | 64. Log the time the power alarm was cleared. |

FIGURE 11

The Bridge Manager is responsible for the following notifications and escalations:

65. The bridge manager will do necessary escalations to higher manager.
66. The bridge manager will be responsible for notification to the appropriate field and NRC managers per the matrix in the Regional Operations Centers Network Failure Procedures per Section 5.0
67. The bridge manager will notify the appropriate internal customers (I.E. Operator Services, RRC, BRC, ACAC, E911 Center etc.)
68. The bridge manager will make the VMS notification ROCNFP per Section 4.0
   A. All messages should be marked urgent.
   B. All messages should contain a contact number.
69. An updated VMS should be sent by the bridge manager periodically to update higher management.
70. A "Final" VMS will be sent by the bridge manager at the close of the event or OMEGA page if a VMS is not required
   A. The bridge manager will include the time the event was cleared, recap the time it started, and include the reason (briefly stated) for the outage if known. See ROCNFP Section 6.0
   B. The bridge manager will send the final VMS to the same list as the initial notification.

Other responsibilities of the Bridge Manager:

71. The bridge manager should confirm that appropriate WFA/LMOS tickets have been referred to the field.
72. During a CO isolation the bridge manager should remind the FWG technician to take a cell phone to the central office that is isolated.
73. The bridge manager will complete an Outage Bridge report by the end of the next business day.
74. The bridge manager will distribute the Outage Bridge Report to those listed in the ROC procedures in section 3.5.

FIGURE 12

FAILURE RESPONSE PROCEDURE AND SYSTEM

CROSS-REFERENCE TO RELATED APPLICATIONS

Not Applicable.

FEDERALLY SPONSORED RESEARCH

Not Applicable.

BACKGROUND OF THE INVENTION

1. Field of the Invention

The present invention is directed to a method of responding to an equipment and/or system failure and, more particularly, to a method of preparing a telecommunication bridge that may be accessed by a group of people, whereby information may be shared and the resolution effort of all involved individuals and equipment may be centrally managed and coordinated.

2. Description of the Invention Background

Failures that require input from diverse disciplines for prompt resolution commonly occur in large systems. For example, a regional telephone provider may experience thousands of service failures each day. Many of those failures may effect only one or a few customers and may be resolved by an individual or small group of people dispatched to the locality of the failure. Failures that effect a large group of customers, however, pose providers with a difficult situation because such major failures are often more difficult to troubleshoot and resolve and can simultaneously demand prompt resolution because of the number of customers effected by the failure.

Major failures have commonly been resolved by bringing people together in a particular facility that has become aware of the failure. In large systems, however, that method can be inefficient. For example, a regional telecommunications provider may have multiple facilities for sensing system failures. A major failure is often sensed at more than one facility, and the sensed data for a single failure may vary from one facility to another. When the traditional failure resolution method is employed, each facility that senses the failure may attempt to correct the failure separately and with only the sensed data available at that facility. That method can result in effort duplication and ineffective use of resources. In addition, those working to resolve the problem utilizing the prior method often work with less than all available data regarding the failure because they lack communication with other facilities that may be sensing other parameters or system functionality. Ultimately, the traditional failure resolution method results in wasted time and money.

Thus, a need exists for a method and system for resolving major failures in multi-faceted systems.

SUMMARY OF THE INVENTION

In accordance with a particularly preferred form of the present invention, there is provided a failure response method. The method includes preparing a bridge having an address of a telecommunication system for common access by a predetermined group of resources, sending an alpha communication communicating the telecommunication system address to the predetermined group of resources, coordinating the resources through the bridge to correct the failure, and sending a final message to the predetermined group of resources by the telecommunication system when the failure has been corrected.

A failure response system is also provided. The failure response system includes a storage device containing contact data for a predetermined group of resources to be utilized when responding to a failure and an address of a telecommunication system for common access by the predetermined group of resources. The system also includes a processor containing instructions which, when executed by the processor, cause the processor to retrieve the contact data for the predetermined group of resources from the storage device, retrieve the address of the telecommunication system from the storage device and send an alpha communication communicating the telecommunication system address to the predetermined group of resources.

A computer readable medium having stored thereon instructions which, when executed by a processor, cause the processor to retrieve contact data for the predetermined group of resources from a storage device, retrieve a telecommunication system address from the storage device, and send an alpha communication communicating the telecommunication system address to the predetermined group of resources is also provided.

Thus, the present invention offers the feature of permitting a major failure in a multi-faceted system to be resolved quickly and efficiently.

The present invention furthermore beneficially permits information pertaining to the failure and resources for correcting the failure to be pooled together.

Another benefit of the present invention is that it beneficially allows personnel and resources in more than one location to combine their efforts when resolving a failure and minimizes duplicative and counter-productive efforts.

BRIEF DESCRIPTION OF THE DRAWINGS

In the accompanying Figures, there are shown present preferred embodiments of the invention wherein like reference numerals are employed to designate like parts and wherein:

FIG. 4 is a sample login page of a home page that may be used to practice one embodiment of the subject invention;

FIG. 5 is a portion of a sample edit pagers page of a home page that may be used to practice one embodiment of the subject invention;

FIG. 6 is another portion of the sample edit pagers page of FIG. 5;

FIG. 7 is a sample send page of a home page that may be used to practice one embodiment of the subject invention;

FIG. 8 is a portion of a sample regional operation center process check list that may be used to practice one embodiment of the subject invention;

FIG. 9 is another portion of the checklist of FIG. 8;

FIG. 10 is another portion of the checklist of FIGS. 8 and 9;

FIG. 11 is another portion of the checklist of FIGS. 8–10; and

FIG. 12 is another portion of the checklist of FIGS. 8–11.

DETAILED DESCRIPTION OF THE PREFERRED EMBODIMENT

It is to be understood that the Figures and descriptions of the present invention included herein illustrate and describe elements that are of particular relevance to the present invention, while eliminating, for purposes of clarity, other elements that may be found in certain troubleshooting and failure resolution methods and apparatuses. Because the construction and implementation of such other elements are well known in the art, and because a discussion of them would not facilitate a better understanding of the present invention, a discussion of those elements is not provided herein. It is also to be understood that the embodiments of the present invention that are described herein are illustrative only and are not exhaustive of the manners of embodying the present invention. For example, it will be recognized by those skilled in the art that while the present invention is described in connection with a failure of at least a portion of a telecommunication network, the method may be readily adapted to be utilized in connection with failures in other systems or networks such as, for example, an electric, gas, or water utility system. The method may also be utilized with non-utility related systems such as, for example, a failure of a system in a manufacturing facility. It will furthermore be recognized that certain steps described herein may not be applicable in a particular application while additional steps not described herein may be necessary in a particular application.

Figure 1:
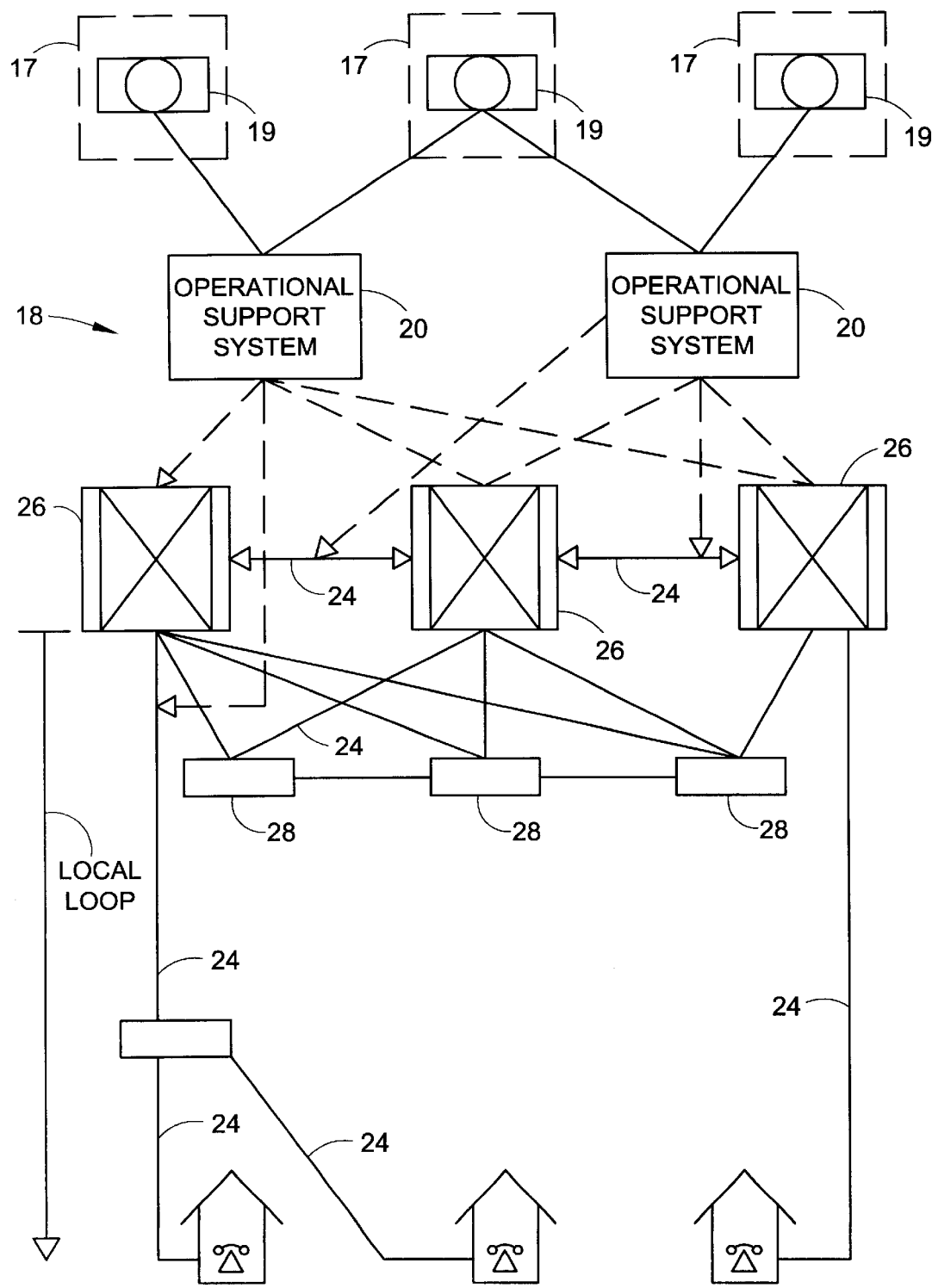
FIG. 1 is a schematic diagram of a public switched telephone network.

Referring now to the drawings for the purposes of illustrating the present preferred embodiments of the invention only and not for the purposes of limiting the same, FIG. 1 is a diagram illustrating a telecommunication network 18 of the present invention which is referred to as a public switched telephone network or PSTN interchangeably herein. FIG. 1 and a description of the network entities depicted therein and their interaction are included herein as a general overview of a standard telecommunication network. The network 18 illustrated in FIG. 1 represents one possible grouping of network entities that is useful as an example in connection with the apparatuses and methods described herein. The present invention does not necessarily utilize every network entity depicted in FIG. 1 and, furthermore, may utilize additional entities not depicted in FIG. 1. FIG. 1 illustrates operational support systems 20, conductors 24 such as, for example, copper wire or fiber optic conductors, switches 26 and platforms 28. It will be recognized that a greater or lesser number of operational support systems 20, conductors 24, switches 26, and platforms 28 may be utilized in a particular telecommunications system.

The operational support systems 20 are typically computer systems from which the operability of at least major conductors 24 or trunk lines, and major switches 26 and platforms 28 are monitored. Each of the operational support systems 20 may be accessed remotely from, for example, a regional operations center 17 that may have a monitoring work station 19 therein. It will, however, be recognized that additional operational support systems such as subordinate facilities that monitor the network at a point down-line from the operational support systems 20 illustrated and superior facilities that may for example monitor conductors 24, switches 26, and platforms 28 in the network 18 from a central location may also be present in a particular telecommunication network. Due to the frequency of minor failures in a typical telecommunications network, certain conductors 24, switches 26 and platforms 28 effecting fewer than 100 customers, for example, may not be monitored by the operational support systems 20. A particular conductor 24, switch 26, and/or platform 28 may furthermore be monitored separately at one or more monitoring stations located at a regional operations center 20. For example, symptoms of a single failure may also become evident at more than one monitoring station 19 because a failure may manifest itself in the operation of, for example, a switch 26 and a conductor 24. Likewise, symptoms of a single failure may become evident at more than one monitoring station 19 because the monitoring facilities 20 may sense the same portions of the network 18 from different locations in the network 18. Humans may also observe the data sensed at the monitoring stations 20 to identify network 18 failures. Conductor and platform failures are commonly referred to as "facility" or "transport" failures, while switch failures are generally referred to simply as "switch" failures.

The switches 24 may be any known telecommunication switch that operate to connect a calling party to a call receiving party. For example, switches such as those telecommunication switches manufactured by Lucent (DMS 10, DMS 100, etc.) could be employed.

The platforms 26 include any other device for operating a telecommunications network such as, for example, a computer controlled device that interfaces a call on an incoming fiber line to multiple outgoing fibers. Platforms such as those manufactured by Lucent as Digital Access Cross Connect Switches (DACS) may be employed.

Figure 2:
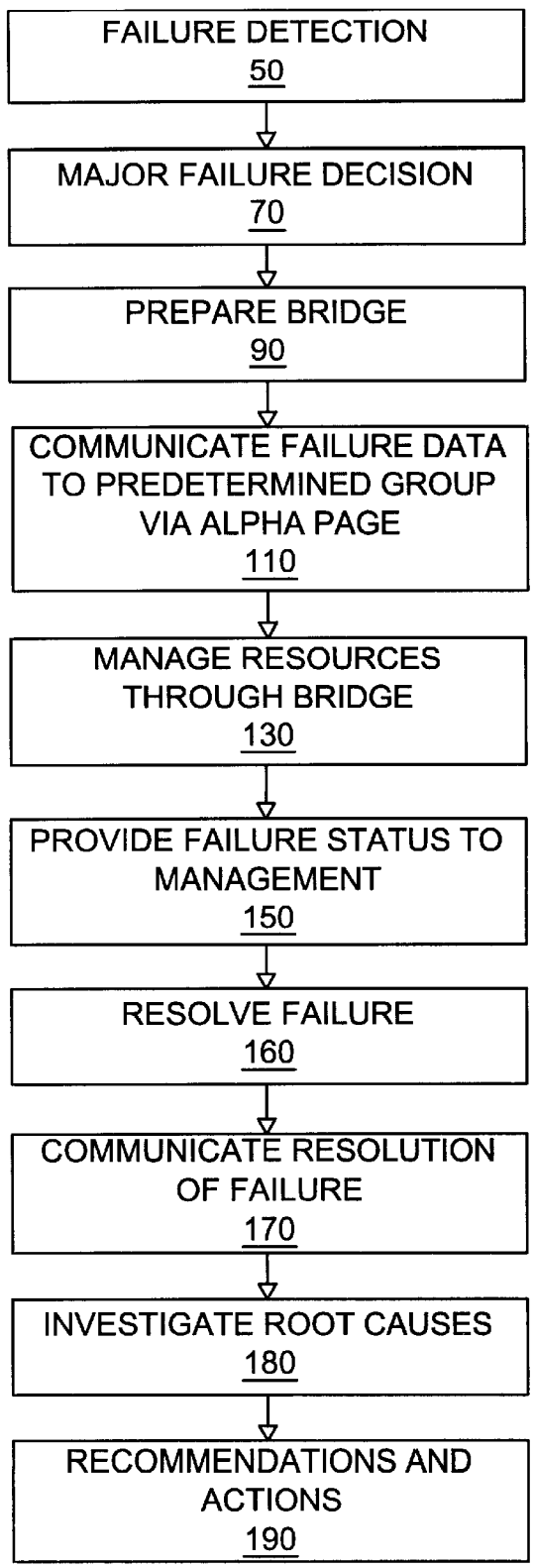
FIG. 2 is a flow diagram illustrating a failure resolution flow of the present invention.

FIG. 2 is a flow diagram illustrating an embodiment of a failure response process flow 48 of the present invention. The failure response process flow 48 includes detecting a failure 50, deciding whether the failure is a major failure 70, preparing a bridge 90, communicating failure data to a predetermined group 110, coordinating resources through the bridge 130, providing failure status 150, resolving the failure 160, communicating resolution of the failure 170, performing a root cause investigation 180 and developing and implements recommendations and actions 190. See FIG. 2.

The failure decision step 50 is a determination that a system or portion of a system has failed. In a telecommunications network, a failure may be identified by one or more operational support systems 20 or may be reported to one or more monitoring stations 19 by, for example, field technicians or customers. For example, regional operating centers including a network reliability center ("NRC"), network management center ("NMC"), or regional technical support group monitoring switches ("RTSG-S") will initially identify most network failures.

Upon discovery of a failure by a monitoring facility 20 (i.e., a network management center or regional technical support group), that group contacts the appropriate network reliability center location and requests the network reliability center to open a conference bridge and issue an message to the appropriate resources defined herein as a "predetermined group of resources" or a "predetermined group of people." The network reliability center may then assume responsibility for notifying the appropriate resources of the failure, and establish a maintenance bridge if the failure is determined to be a major failure.

At the major failure decision step 70, a decision is made as to whether the failure qualifies as a "major" failure to be dealt with by the failure resolution procedure 18 described herein, or whether the failure is a "minor" failure that may be dealt with by conventional methods. The network management center or regional technical support group monitoring switches, upon recognition by any data symptomatic of a major network failure, contacts the network reliability center. Should the network reliability center identify a major network failure or be contacted by the network management center or regional technical support group, the network reliability center surveillance floor supervisor will open a conference bridge and send a communication known as an "alpha communication" or an "alpha flash" to the predetermined group of people.

A major failure may include, for example, any failure that has a major media impact or a major customer impact. The criteria for determining whether a major failure has occurred can be of such a scope to prevent or reduce the likelihood of the regional operations centers being surprised by a failure that caused either widespread adverse customer reaction, blocked a significant number of interoffice network calls, or interfered with telecommunications services for one or more major customers. For example, general guidelines for determining whether a major failure has occurred in a telecommunications network are listed in Table 1. The guidelines are merely exemplary guidelines that may be employed in a telecommunication environment. The skilled artisan will readily appreciate, however, that other appropriate guidelines tailored to the specific system and environment involved may be employed without departing from the spirit and scope of the present invention.

TABLE 1

Network Event Classification

| Network Event Description | Major Event & Establish Bridge? | Send Admin. Message | Prepare Outrage Bridge Report | Abnrml | Switch or Facility Bridge Mgr. |
|---|---|---|---|---|---|
| 1. Any tandem or host office failure or partial failure effecting 40% or more of a host office's total lines or trunks for 10 minutes or more. (total lines = host lines + all remote lines) | Yes | Yes | Yes | Yes if >2 min. | Switch |
| 2. Any host office isolated from the SS7 Network for longer than 5 minutes. | Yes | Yes | Yes | Yes if >31 sec. | Both if not readily determinable |
| 3. a. Failure or isolation of one STP | Yes | Yes | Yes | Yes | Switch |
| b. Failure of both nodes of a mated pair (STP, SCP, SCN, or CSN) | Yes | Yes | Yes | Yes | Switch |
| c. Failure/Isolation of one node (SCP, SCN, CSN) | No | No | No | No | None |
| 4. Any network event that will exceed 5,000 blocked calls. | Yes | Yes, if >30,000 blocked calls | Yes, if >5,000 blocked calls | Yes | Both if not readily determinable |
| 5. Any event that has 3,000 or more message trunks failed, regardless of blocked call count. (Note: if >30 minutes, it is FCC reportable) | Yes | Yes | Yes | Yes | Facility |
| 6. E911 isolation effecting >10,000 lines - no reroute available | Yes | Yes | Yes | Yes, if >31 sec. | Switch |
| 7. Any Office operating on batteries >3 hours or that has dropped below −46vdc. (Maintenance bridge set up at 1 hour with regional technical support group power. Specialist to send regional operations center Alpha Flash at specialist's direction if problem has not been identified at 3 hr. mark, or correction is not expected within the hour) | Yes | Yes, if likely service loss | Yes, if Admin. Message is sent | Yes | Switch |
| 8. Office fire or any fire that damages >1,000 lines | Yes | Yes | Yes | Yes | Switch |
| 9. Any flooded Office or Office in immediate danger of being flooded | Yes | Yes | Yes | Yes | Switch |
| 10. Voice Mail System box failure >1 hr. or >500 customer trouble reports | Yes | Yes | Yes | Yes, if >1 hr. | Switch |
| 11. Any network condition that has the potential to cause adverse media coverage or adverse customer reaction from major customers (specifically E911 service effecting or FAA service effecting) | Yes | Yes | Yes, regardless of where event is located | Yes | Both if not readily determinable |
| 12. For a major trouble in territory having an independent (either switch or facility), set up bridge and conduct it until the trouble is definitely isolated into that territory. Update bridge notes later with blocked calls and duration. | Yes | If >1 hr. and event has not been isolated | Only if event is within the Companies network | Yes | Both if not readily determinable |
| 13. Any network events that adversely effect Company departments such as Operator Services, Business Repair, Residence Repair, Business Office, or Small Business. | Yes | Yes | Yes | Yes | Both if not readily determinable |
| 14. Any FCC reportable event requires an Administrative Message and a Bridge Report. (The network management center determines if an event is FCC reportable) See FIG. 5. | Yes | Yes | Yes | Yes | Both if not readily determinable |

A communication bridge is prepared at step 90 if it is determined that a major failure has occurred. The communication bridge may include a conference call utilizing a telecommunication system, whereby multiple people may simultaneously be connected by way of, for example, a common voice communication channel, such that all participants or members of the predetermined group of people may simultaneously communicate with one another. The bridge is established to bring together the resources necessary to limit the duration and the impact of the network event. Several bridges may typically available for use. Some bridges may accommodate up to 30 simultaneous users. A number for the selected bridge is sent out via an alpha page and all participants call that number and can talk to each other.

At step 110, data regarding the failure is communicated to the predetermined group of resources by, for example, the surveillance supervisor that is on-duty with the network reliability center analysis group that first detected the failure. Those resources or members of the predetermined group may include, for example, system monitoring personnel, troubleshooting personnel, repair personnel, and management personnel, as well as equipment such as, for example, automatic monitoring equipment. The resources may also include, for example, a general announcement to a facility or section within a facility.

Should the network reliability center identify a major network failure, the network reliability center surveillance floor supervisor opens a conference bridge and issues an "alpha flash." An alpha flash comprises a telecommunication message that may include, for example, the name of the facility issuing the alpha flash, the words "ALPHA FLASH," the location of the failure or, if the location is unknown, data that may be utilized in determining the location of the failure, the symptom or symptoms that have been identified and that indicate that a failure has occurred, and a conference bridge number. The words "ALPHA FLASH" alert all alpha flash recipients that this is the initial notification of a possible major network outage and that their presence on the bridge is for the purpose of determining who should be involved and how restoration should proceed. The symptoms may, for example, include information concerning failed device if known or the effect that the failure is having on the network when a failed device has not yet been identified.

The alpha flash may be communicated to the above-mentioned predetermined group of people or resources. A surveillance supervisor may, for example, be responsible for sending the alpha flash to one or more distribution lists that are appropriate for the type of failure that has occurred. For example, when a switch problem is detected, the alpha flash may be sent to an "all events list," an appropriate state list, the bridge manager for the switch group, and a list that includes personnel knowledgeable about the type of switch that is involved. When a facilities problem is detected, the alpha flash may be sent to the all events list, the appropriate state list, the bridge manager for the facilities group, a transport list, and a list that includes personnel knowledgeable about the type of transport that is involved. When an independent office problem is detected, the alpha flash may be sent to the all events list, the appropriate state list, and the bridge manager for the switch group or the bridge manager for the facility group.

FIG. 4—illustrate a web paging web site home page that may be utilized to facilitate prompt communication with the resources. FIG. 4 illustrates a typical login page. After the user logs in, they will be provided with access to an "edit pager" page (FIGS. 5 and 6). Each of the lists of resources to be contacted may be maintained in a central storage device such as, for example, a data base that may be accessible to all facilities by way of, for example, an intranet or internet. The lists may furthermore be updated by individuals as they come on duty or on call by removing the previously responsible person from the list and entering the current responsible person into the list. The alpha flash may be prepared by selecting the appropriate lists from a screen, entering other appropriate data into the alpha flash via that screen, and sending the alpha flash from that screen. See FIG. 7.

All specialists in the regional operations center should be built on the network reliability center web paging web site, but should only be added to a group list when they are on-duty. For example, the regional technical support group monitoring transport may have 10 specialists identified on the web site, but only one specialist may be active for a particular week, and only that active specialist would receive a page if a group list that includes regional technical support group monitoring transport were selected and paged. The other specialists would be identified on the web site and could be paged individually if needed. Furthermore, each individual on a group list should insure that their pager information is kept current at all times to assure prompt notification and response of persons required for resolution of a failure.

Normally, the facilities to be notified will include the appropriate network reliability center, network management center, regional operations centers, and the regional technical support groups monitoring switches and or transport systems. Area managers may be included in the state list.

Regional operations centers and regional technical support groups that do not operate 24 hours a day, 7 days a week may assign a duty supervisor to receive alpha flashes when the facility is not operating. The duty supervisor may update the paging lists on, for example, the network reliability center web paging web site whenever the duty responsibilities change, by adding the on-duty supervisor's name to the appropriate alpha flash group list or lists and deleting the person coming off-duty from the appropriate group list or lists. Such actions may insure that the proper regional technical support group specialist is always notified.

The alpha flash may be sent to the appropriate network reliability center bridge manager web paging list for each failure. If it cannot be initially determined whether the failure is switch or facility related, both network reliability center bridge managers may be paged, and both may join the bridge until a determination is made as to the actual area of failure.

After the network reliability center web paging software has sent the message to all persons on the selected group lists, the surveillance supervisor may check the message log to determine if any of the messages failed to be transmitted. If the reason for failure can be determined and corrected, failed messages are resent. If the reason for failure is not readily apparent, the failure should be noted and corrected when time permits. Any paged center, network reliability center bridge manager, or regional technical support group specialist that is not on the bridge within a predetermined amount of time such as, for example, 10 minutes from the time the alpha flash is sent, may be paged again and located by appropriate surveillance personnel. Should that page/call fail to get a response within another predetermined amount of time such as, for example, 10 minutes, the problem may be escalated via, for example, telephone call and pager to the next higher level of management within that center. This escalation procedure may continue, if desired, every 10 minutes or other appropriate time interval until, for example, the appropriate member of management has been called and paged.

While the paged centers are accessing the bridge, the network reliability center analysis group may attempt to contact the field work group with maintenance responsibilities for the location to determine if any work was being done in the office at the time of the failure or perhaps earlier in the day. If appropriate for the type of trouble, the involved network reliability center analysis group may contact the field work group to determine if any work was being performed that might be helpful in identifying the cause of the failure.

The network reliability center surveillance group sending the alpha flash may also assume control of the maintenance bridge, and all of the duties that go with it, until the network reliability center bridge manager is able to join the bridge and assume control responsibilities. The network reliability center bridge manager may insure that activities on the bridge are conducted in a manner conducive to the resolution of the problem, and that appropriate notifications and escalations are made to insure minimum network impact. Escalations may include, for example, exceeding a threshold of blocked calls, or any other threshold such as, for example, those indicated in Table 1 above.

Upon joining the bridge, the network reliability center bridge manager may request that the surveillance supervisor provide a roll call of persons that are already on the bridge. At that time, the network reliability center bridge manager may assume administrative control of the bridge. The surveillance supervisor may then assume the role of bridge participant and monitor (possibly using a technician for this task) the bridge unless released by the network reliability center bridge manager. The regional technical support group specialists may provide technical direction and overall responsibility for service restoration while the network reliability center bridge manager maintains administrative control and responsibility for notifying the appropriate personnel of the status of the restoration. Any other bridge participant that wishes to control some aspect of restoration may seek consensus from the network reliability center bridge manager before suggesting that bridge participants be reassigned from their current duties to perform other functions. For example, a field general manager that would like to suggest that regional technical support group temporarily discontinue their current maintenance path to check for applications of recent software modifications might have to gain the concurrence of the network reliability center bridge manager before that could be accomplished.

Notification and escalation may be the responsibility of the network reliability center bridge manager. However, even though notification to groups that could be potentially impacted by the network event is important, the emphasis on the maintenance bridge may be on restoral and/or limiting the impact of the event.

For example, appropriate notification steps might include informing appropriate upper management and/or external customer personnel any time a network event exceeds 40,000 blocked calls. The network management center director, for example, may be the regional operations center's first point of contact to the external customer. If the network management center director is unavailable, the network management center general manager may contact the external customer. If the network management center director and network management center general manager are both unavailable, the regional operations center Vice President may contact the external customer. If all three of these individuals are unavailable, a representative from the network management center may contact the external customer. After the identity of the person to contact the external customer is determined, the network management provides that information to the bridge manager. The network reliability center bridge manager may then send a message such as, for example, a voice mail or a page, to a list of people other than those receiving the alpha flash that are to be informed of such an event. The bridge manager may also request that the network reliability center surveillance group send a page to the original alpha flash list and any other personnel or list of personnel that may need to be informed of such an occurrence. The page may, for example, identify the type and location of the trouble, advise that the 40,000 blocked call threshold has been reached and indicate that the effected customer is being notified.

Each center that is normally involved in trouble isolation and resolution may obtain an appropriate number of alpha-pagers where the alpha flash utilizes a paging system, to provide official notification for that particular center. The pager may, for example, be worn by individuals in the center who have responsibility for responding to official regional operations center notifications of network failures, or it may be placed in the center at such a location to enable it to be heard and responded to at any time of day by someone in the center.

For centers that transfer their responsibilities to another center during certain hours, each center may have an alpha flash even though only one of the centers will normally respond to the page. When a major network event effecting a center that does not operate 24 hours a day, 7 days a week occurs, a page may be sent to the appropriate paging list and pagers at both the effected facility and the facility that assumes responsibility for that facility when closed.

If a regional operations center is a daylight only operation, the pager may alternately be placed at a single point of contact (SPOC) location during the day and be transferred back to a center duty supervisor when the center is not operating. In that case, the regional operations center may place the center pager number and the duty specialist's pager number on the paging list for a particular technology. Thus, for example, when the paging list that includes that center and technology is selected, both the single point of contact pager number and the person on duty for a particular technology will be paged on every network event for that technology.

There may also be situations where a maintenance bridge already exists on a network problem and the event escalates into a network event that meets, for example, the criteria set forth in Table 1. In that case, one of the participants on the maintenance bridge may discontinue participation on the bridge and contact the network reliability center surveillance floor supervisor for the area and technology effected and request that a network reliability center alpha flash be sent to the appropriate alpha paging list. The maintenance bridge participant may provide enough information to formulate a standard alpha flash, including location and impact of the trouble, the maintenance bridge number currently in use, and the reason the event qualifies for an alpha flash. The surveillance floor supervisor may formulate and send the alpha flash and assume the role of bridge manager until the actual network reliability center bridge manager joins the bridge. The bridge number provided in the alpha flash should be the one currently in use.

In extreme cases, the network reliability center bridge manager may determine that voice traffic on the maintenance bridge is too intense and is hindering restoral efforts. In that case, an administrative bridge may be established by paging a secondary bridge manager or by locating that secondary bridge manager through appropriate surveillance personnel, and asking the secondary bridge manager to chair the administrative bridge. The network reliability center bridge manager may remain on the maintenance bridge and request that the secondary bridge manager chair the administrative bridge and access the maintenance bridge for updates at regular intervals, which may be, for example every 15 minutes. In addition, the bridge manager may designate those maintenance bridge participants who should leave the maintenance bridge and join the administrative bridge. The primary network reliability center bridge manager may then direct all calls not specifically related to service restoration to the administrative bridge.

At step 130, the resources are coordinated through the bridge. Once the alpha flash has been sent, the network reliability center surveillance floor supervisor may assume the role of bridge manager until the appropriate network reliability center bridge manager joins the bridge and assumes that responsibility. That responsibility may include logging the times that various persons call in as well as monitoring the bridge for participation of all paged centers.

The regional technical support group monitoring switches and/or the regional technical support group monitoring transport may provide technical direction and overall responsibility for service restoration while the network reliability center bridge manager maintains administrative control and responsibility for notification. Any other bridge participant that wishes to control some aspect of restoration may seek consensus from the network reliability center bridge manager before suggesting that bridge participants alter the functions they are currently performing.

There may be times when more than one qualifying major network event is occurring in either switch or facility at the same time. In those instances, the bridge manager that is on the first bridge established may notify the secondary bridge manager that he will need to be the bridge manager for the second event. The bridge manager on the first bridge may notify the secondary bridge manager directly or may briefly join the second bridge and request that network reliability center contact the secondary bridge manager by way of, for example, a page or a telephone call. The same procedure may be followed for each subsequent simultaneous event.

The network reliability center duty bridge manager may generally be utilized for all major network events, and his duties may include; overall administration and maintenance of the conference bridge as well as documentation of bridge, restoration and escalation events.

In cases wherein one or more regional technical support group is involved on the bridge, the regional technical support group may lead the maintenance and service restoration efforts, while the network reliability center duty bridge manager maintains overall administrative control of the bridge throughout the entire restoration process. Should the same regional technical support group specialist be required on two simultaneous bridges, the specialist may either get another specialist to participate on one of the bridges, or request that the network reliability center assist him with bringing another specialist onto one of the bridges by suggesting names of specialists to contact. Should this fail to produce an regional technical support group specialist in a short period of time, the appropriate regional technical support group area manager may be contacted for assistance.

An outage bridge report may be generated whenever an event results in the sending of management or customer notification, or if the failure qualifies as a major failure because, for example, the failure has caused in excess of 5,000 blocked calls. The outage bridge report, which may include a chronological log of events related to the current failure, may be maintained by the network reliability center duty bridge manager as the events occur. That log may serve as a starting point for investigations and may contain any information which might be pertinent to determining the root cause of he failure or event. The log may also include a chronological list of what transpired on the bridge, including the time, time zone, location of each significant step in the restoration, and analysis of the problem that has been conducted during the network event by all involved parties. In addition, a list of any unresolved questions may be included with the log. FIGS. 8–11 depict an example of a regional operation center process check list that could be used to practice one embodiment of the method of the present invention.

Specific information that should be obtained for major network events will vary based on whether or not the event is switch-related or facility-related. A list of event-specific items that may be obtained may be maintained and updated as novel failures are encountered in, for example, a document maintained for reference during major network events.

By the end of the next working day after the restoral has been completed, the network reliability center bridge manager may forward a copy of the outage bridge report to appropriate management and/or technical staff which may include, for example, the vice president of network staff and centers, the regional operations center vice president, all regional operations center directors, the general manager of the defect reduction center, the regional operations center staff, and appropriate regional technical support group personnel, area managers and project managers. A network reliability center manager in the facility analysis group may assume responsibility for maintaining the list of report recipients and distributing the most current list to all of the above individuals when changes occur.

The appropriate regional operations center manager may also forward a copy of the outage bridge report to a group that will conduct the switch failure investigation and/or facility failure investigation. For example, in the case of a switch problem, the switch failure investigation may be performed by the regional technical support group for switches. When the problem involves a transport platform, the facility failure investigation may be performed by the regional technical support group for transport. Likewise, when the problem involves an investigation for a cut transport, the network reliability center facility analysis group may prepare the facility failure investigation. The group with switch failure investigation and/or facility failure investigation responsibilities may then commission a preliminary switch failure investigation and/or facility failure investigation by the end of a specified time period such as, for example, by the end of the third working day following the event. The format of the preliminary switch failure investigation and/or facility failure investigation may be placed in a summary format and be distributed to the same groups and individuals as the outage bridge report.

For non-major network events, an alpha flash may not be appropriate, and the appropriate network reliability center analysis supervisor or off-duty supervisor may administer any maintenance bridges that are established. In cases where a regional technical support group is involved, the regional technical support group will lead the maintenance and service restoration efforts, but the involved network reliability center analysis supervisor will maintain overall control of the bridge throughout the entire restoration.

If a non-major event deteriorates into a major event, one of the participants on the maintenance bridge may discontinue participation on the bridge and contact the network reliability center surveillance floor supervisor for the area effected and request that an network reliability center alpha flash be sent to the appropriate alpha paging list or lists. It is desirable for the caller to provide enough information to formulate a standard alpha flash, including location and impact of the trouble, the maintenance bridge number currently in use, and the reason the event qualifies for an alpha flash. The surveillance floor supervisor may then formulate and send the alpha flash to the individuals on the distribution list(s) and thereafter assume the role of bridge manager until the actual network reliability center bridge manager joins the bridge. The bridge number provided in the alpha flash may be the bridge currently in use in connection with the non-major event.

While the maintenance bridge may be used primarily for service restoration purposes, it should be understood that the maintenance bridge may be accessed by field area managers, regional operations center area managers, and company officers seeking a status of the restoration efforts. In an effort to assist the bridge manager in the performance of their job duties, the following guidelines have been established for bridge conduct.

At step 150, the status of the failure and steps employed to resolve the failure is communicated to, for example, higher management and other designated personnel who need to be aware of the status of the failure. The network reliability center bridge manager may assure, for example, that: (i) notifications have been made to all regional operations centers concerning the nature of the network problem and the established bridge access number; (ii) notifications have been made to a work management center (WMC) for dispatch of repair personnel if required; (iii) notifications have been made to the appropriate field and network reliability center managers; and (iv) that notifications have been made to appropriate internal customers. The notification may be performed by groups, and the bridge manager may wish to query those groups to verify that they have been notified.

The network reliability center switch and/or facility duty bridge manager may maintain a high level of awareness of developments or lack of developments during the restoration, and minimize unrelated conversations so that restoral efforts proceed smoothly and expeditiously. While respecting the position and level of all those who may join the bridge, it may be desirable for the bridge manager to hold a position of authority over all conversations and activities on the bridge.

In the event that the bridge must be terminated and reestablished, the network reliability center bridge manager may announce the new bridge number on the existing call and receive a positive response from all current participants that they will join the new bridge. Upon establishment of the new bridge, a roll call may be made immediately and a new alpha flash, stating that the bridge has been reestablished and the address of the new bridge, may be sent to all current participants of the bridge and any additional participants that are required on the bridge or who may desire to monitor the bridge.

The bridge manager may also wish to: (i) confirm that appropriate work orders have been referred to the field; (ii) maintain a list of those individuals who have joined the bridge and set forth their role in the restoration; and (iii) maintain an awareness of the number of blocked calls experienced at all times and the impact those calls are having on the network 18. The bridge manager may query everyone on the bridge concerning the impact to any major internal and external customers that could be effected by the network event. The network management center may also update the conference bridge participants at regular intervals with the number of calls that have been blocked and notify the bridge manager if the number of blocked calls exceeds a predetermined threshold. The bridge manager may inform those individuals who should be aware of the status of the restoration of that status at regular intervals. The bridge manager may, for example, send an interconnect page to the original alpha flash list, and a voice mail to other people who need to know the status such as, for example, management and/or media relations personnel. If the number of blocked calls experienced cannot be determined, the bridge manager may provide that information to the appropriate people. The bridge manager may initially determine whether emergency service (i.e., 911 or FAA) is effected by the event and insure that appropriate notifications are made. The bridge manager may also determine whether the event has potential to have major media impact or major customer impact by, for example, utilizing the guidelines provided in Table 1, and insure that appropriate notifications are made.

The bridge manager may maintain an awareness of the level of technical support needed to bring the restoration to a timely conclusion and insure that it is present on the call. If the level of support needs to be increased, the bridge manager may enlist the help of additional technical support personnel. The bridge manager may also maintain an awareness of the level of trained personnel from, for example, the network reliability center and the field work group. If the level is not adequate, the bridge manager may bring additional personnel onto the bridge. The bridge manager may also maintain an awareness of: (i) the time of day or night, (ii) the ramifications of any impending shift change; and (iii) the arrangements that may be required to insure the availability of appropriate personnel.

The bridge manager may also insure the technicians are maintaining proper notes in mechanized systems such as Work Force Administration ("WFA"), Loop Maintenance Operations System ("LMOS") and Integrated Network reliability Center Tool System ("INTS"). It will be appreciated that such information may be used to facilitate subsequent investigation and future maintenance efforts.

Should requests for status become too numerous and impair maintenance efforts, the bridge manager may elect to remind the caller of the necessity of affording priority to the conversations necessary for restoral efforts, or request the caller to dial another number off line to the bridge and handle the request for status on an individual basis, or inform the caller that the status will be given at the next available opportunity.

In extreme cases, the network reliability center bridge manager may determine that voice traffic on the maintenance bridge is too intense and is hindering restoral efforts. In such a case, an administrative bridge may be setup, with the secondary bridge manager being paged by surveillance, and asked to chair the administrative bridge. The network reliability center bridge manager may remain on the maintenance bridge and request that the secondary bridge manager chair the administrative bridge and access the maintenance bridge for updates at regular intervals. (i.e., approximately every 15 minutes). In addition, the bridge manager may designate which maintenance bridge participants should leave the maintenance bridge and join the administrative bridge. The primary network reliability center bridge manager may direct all calls not specifically directed to service restoration to the administrative bridge when an administrative bridge exists.

The network reliability center bridge manager may review the network situation and determine if the event ever met or currently meets any of the criteria for a regional operations center major network event initially upon joining the bridge. If the event fails to meet the criteria for a major event, an "omega" page can be sent. If the event does or ever did meet the criteria for a major event, then the network reliability center bridge manager may follow the procedures set forth herein for remediation of a failure. For those network events that require an administrative message to be sent such as, for example, a voice mail, a typical time frame for the initial message notification may be 30–60 minutes from the onset of the outage. Network events requiring administrative messages are listed in Table 1 in the column titled "Send Administrative Message."

Bridge managers may send additional updated administrative messages notifications as "updates" if the event is of an extended duration. Those updates may be sent at predetermined time intervals for any major change in status such as, for example, the event becomes FCC reportable. The updates may be sent to the same list as the initial notification including any additional resources as determined by the bridge manager and established protocol.

The failure is resolved at step 160. After the effected portion of the network has been placed back into service, a final message indicating that the failure has been resolved and providing additional information if necessary, is communicated at step 170. That message may, for example, take the form of a page of voice mail message, and may be sent, for example, to all bridge participants. A final administrative message may also be sent at the close of every event for which an initial administrative message had been sent. The final administrative message may include the time the failure was solved, a recap of the time it started, and the reason for the failure, if known. The final administrative messages may be sent to at least the same list as the initial notification.

All administrative messages including initial, update, and final messages, may be marked "Urgent," and may include a telephone number for the recipients to call if they have any questions. If that telephone number is the bridge number, an alternate contact number (such as the bridge manager pager number) may be included in the event that the bridge is full or has been closed.

A common administrative message mailbox may be established for use by the bridge managers so that distribution lists can be maintained in one place rather than in each bridge manager's individual mailbox and distribution lists may be built into the administrative message mailbox. Each list may, for example, include resources to be contacted in case of a failure in a particular geographic area or a particular discipline, and either one or multiple lists may be contacted for any particular failure.

An omega flash which may be, for example, a page, and may be sent if it is determined that the event is determined not to qualify as a major event as, for example, defined in Table 1. The omega flash may be sent to the same paging lists as the alpha flash, and may inform the recipients that upon closer examination, the problem either did not qualify as a major failure, or has been cleared and the bridge has been closed. It is a possibility that a network event could meet the criteria for a major failure, but no administrative message may be sent. An example of such a case is any network event that blocks greater than 5,000 calls, but less than 30,000 calls. The fact that it is has blocked greater than 5,000 calls makes it a major event and may require that an outage bridge report be written, but no administrative message may be sent in this case unless the event reaches 30,000 blocked calls. However, in order to bring closure to the event, it may be necessary to provide information regarding resolution of the event to those that were notified of the problem when it started. This notification could either be done, for example, with an administrative message or an omega flash. An omega flash may be selected because it doesn't require the page recipient to find a telephone and log into a voice mailbox for the close circuit information. The omega flash can provide full closeout information to all page recipients within minutes, and generally may require no extra effort on their part.

Figure 3:
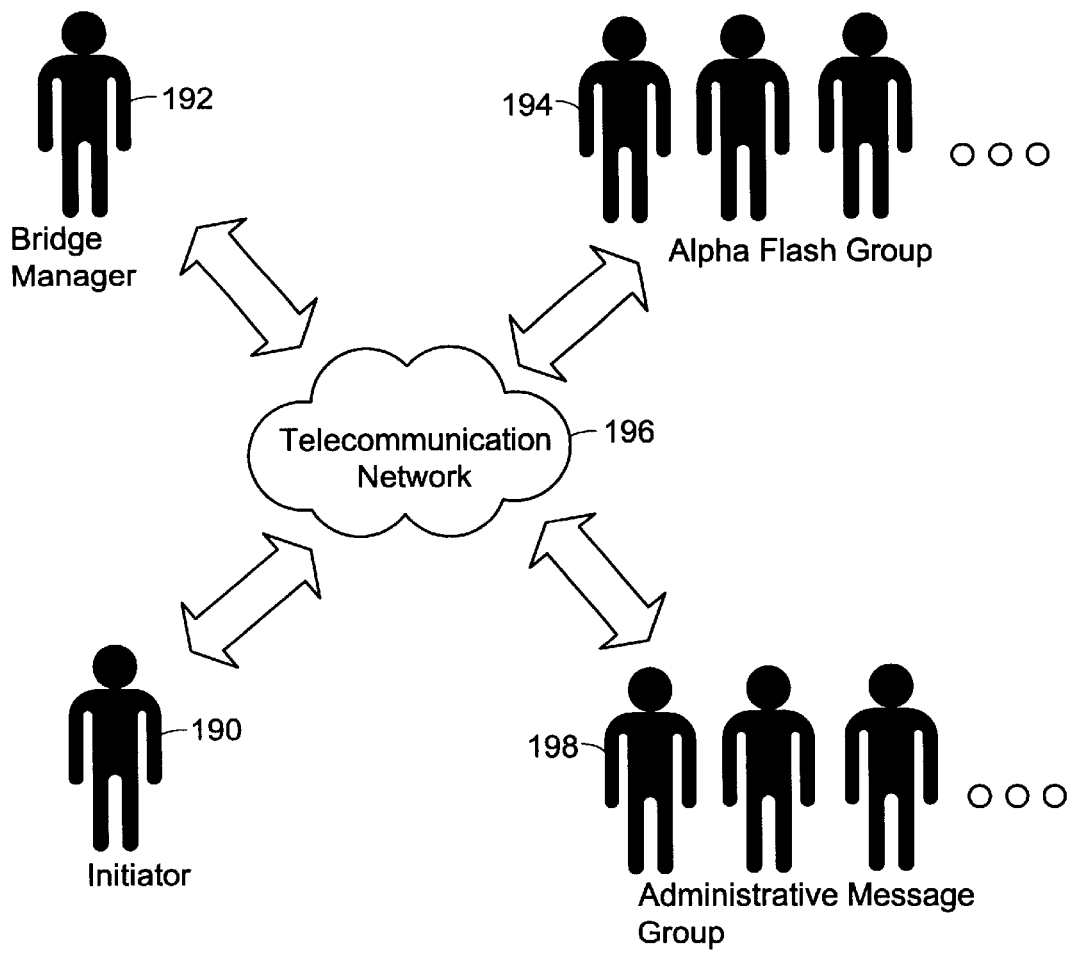
FIG. 3 is a schematic diagram illustrating an information flow of the failure resolution flow of FIG. 2.

FIG. 3 illustrates one example of communication flow through the bridge. In that example, when a major failure occurs, the network reliability center surveillance floor supervisor or other initiator 190 prepares and sends an alpha flash to the bridge manager 192 and the alpha flash group 194 through a telecommunication network 196. The initiator 190, bridge manager 192, and alpha flash group 194 then access a telecommunication network 196 voice bridge and communicate the symptoms of the failure through the bridge. When appropriate, the bridge manager 192 communicates the status of the failure remediation and/or the final restoration of the network to an administrative message group 198, the alpha flash group, and/or any other resources that may benefit from that knowledge. The telecommunication networks utilized for the alpha flash, bridge and update messages may be the same network or different networks. Each of those functions may furthermore be performed by a wireless network, a public switched telephone network, a voice network, or a data network.

The present invention also contemplates a failure response system having a storage device containing data utilized in connection with the method described herein, and a processor containing instructions that, when executed, cause the processor to perform one or more of the steps of the method described herein. In addition, a computer readable medium having stored thereon instructions which, when executed by a processor, cause the processor to perform one or more of the steps of the method described herein is also contemplated by the present invention.

Those of ordinary skill in the art will recognize that many modifications and variations of the present invention may be implemented. The foregoing description and the following claims are intended to cover all such modifications and variations. Furthermore, the materials and processes disclosed are illustrative of the invention but are not exhaustive. Other materials and processes may also be used to utilize the present invention.

What is claimed is:

1. A method of responding to a failure, comprising:
   preparing a bridge having an address of a telecommunication system for common access by a predetermined group of resources;
   sending an alpha communication communicating the telecommunication system address to the predetermined group of resources;
   coordinating resources through the bridge to correct the failure; and
   sending a final message to the predetermined group of resources by the telecommunication system when the failure has been corrected;

wherein preparing a bridge comprises a simultaneous interactive process between a plurality of resources communicating over a common communication channel.

2. The method of claim 1, wherein the predetermined group of resources includes at least one person selected from the group consisting of technicians, repair personnel and managers.

3. The method of claim 1, wherein the alpha flash includes information concerning failure type and failure location.

4. The method of claim 1, wherein said sending includes paging the resources in the predetermined group.

5. The method of claim 1, wherein said sending includes sending an alpha-numeric message to the resources in the predetermined group.

6. The method of claim 1, wherein said coordinating comprises disseminating information relating to the failure between resources in the predetermined group through the bridge.

7. The method of claim 1, further comprising sending messages periodically to a second predetermined group of people to inform the people of the second predetermined group of a status of a failure correction effort.

8. The method of claim 1, wherein said preparing a bridge, said sending an alpha flash and said sending a final message are performed utilizing a common telecommunication system.

9. The method of claim 1, further comprising determining whether the failure is a major failure.

10. The method of claim 1, further comprising sharing sensed data from the failed system between the resources in the predetermined group.

11. The method of claim 1, further comprising identifying resources required to resolve the failure.

12. The method of claim 1, wherein said coordinating includes informing one or more persons in the predetermined group that they are not needed to resolve the failure.

13. The method of claim 1, wherein said coordinating includes:

selecting a bridge manager; and obtaining data related to the failure from the people of the predetermined group through the bridge.

14. The method of claim 1, further comprising:

detecting symptoms of a failure at a first location; and detecting symptoms of the failure at a second location.

15. The method of claim 1, wherein the telecommunication system is a wireless telecommunication network.

16. The method of claim 1, wherein the telecommunication system is a public switched telecommunication network.

17. The method of claim 1, wherein the telecommunication system is a voice network.

18. The method of claim 1, wherein the telecommunication system is a data network.

19. A failure response system, comprising:

a storage device containing contact data for a predetermined group of resources to be utilized when responding to a failure and a telecommunication system address for common access by the predetermined group of resources; and a processor containing instructions which, when executed by said processor, cause said processor to:

prepare a bridge having the telecommunications system address;

retrieve the contact data for the predetermined group of resources from the storage device;

retrieve the telecommunication system address from the storage device;

send an alpha communication communicating the telecommunication system address to the predetermined group of resources, and send a final message to the predetermined group of resources by the telecommunication system when the failure has been corrected;

wherein preparing a bridge comprises a simultaneous interactive process between a plurality of resources communicating over a common communication channel.

20. A computer readable medium having stored thereon instructions which, when executed by a processor, cause the processor to:

prepare a bridge having the telecommunications system address;

retrieve contact data for the predetermined group of resources from a storage device;

retrieve a telecommunication system address from said storage device;

send an alpha communication communicating the telecommunication system address to the predetermined group of resources; and send a final message to the predetermined group of resources by the telecommunication system when the failure has been corrected;

wherein preparing a bridge comprises a simultaneous interactive process between a plurality of resources communicating over a common communication channel.

* * * * *